3,660,512
PROCESS FOR REMOVING SULFUR FROM CRUDE SULFATE TURPENTINE OR DISTILLATE FRACTION THEREOF

Clayton B. Hamby, Charles W. Barrett, and John M. Derfer, Jacksonville, Fla., assignors to SCM Corporation, Cleveland, Ohio
Filed Apr. 13, 1970, Ser. No. 27,578
Int. Cl. C07c *13/00, 27/02*
U.S. Cl. 260—675.5                                    9 Claims

ABSTRACT OF THE DISCLOSURE

Crude sulfate turpentine or distillate fraction thereof is desulfurized while simultaneously retarding chlorination of the organic components therein. The stock for treatment is mixed with an aqueous dispersion of hypochlorite containing not substantially more than about 10% available chlorine and having a pH from 10.1 to 10.6 until maximum desulfurization has occurred consistent with acceptable limited increase in organic chloride. The resulting desulfurized raffinate phase is separated from the aqueous phase, washed with water, and recovered.

---

In crude sulfate turpentine (CST) or distillate fractions thereof there is generally a high concentration (5000 p.p.m. and above) of indigenous sulfur compounds. These sulfur compounds are typically organic sulfides and mercaptans. They impart objectionable odor to, and otherwise impair the quality and usefulness of, the resultant turpentine. Also, the sulfur compounds are carried over into the distillate fraction of turpentine and interfere with the quality and usefulness of components therein; the components include $\alpha$-pinene, $\beta$-pinene, $\beta$-phellandrene, myrcene, camphene, carene, limonene, etc. A detailed description of U.S. and Canadian turpentines is found in "Turpentines from the Pulpwoods of United States and Canada" by Drew and Pylant, appearing in TAPPI, vol. 49, No. 10, October 1966, pp. 430–438. In reactions of such fractions, sulfur compounds often are deleterious, e.g., they can poison catalysts and affect yields of resultant product.

Heretofore, it has been proposed to desulfurize or sweeten turpentine or a distillate fraction thereof, such as $\alpha$-pinene, by treating with aqueous sodium hypochlorite solution stabilized with a proportion of sodium hydroxide so that such solution has pH of 11, 12, or even higher. Substantial chlorination of unsaturated organics resulted during such desulfurization treatment. To attain levels of appreciable desulfurization (e.g., from 5000 p.p.m. initially down to 200–1000 p.p.m. from southeastern CST) organic chloride content substantially above 250 p.p.m. and even up to 1500 p.p.m. can result. Such chloride content generally is objectionable, for example, in alpha or beta-pinene because it can impart cloudiness to products polymerized from same, equipment corrosion problems are compounded, and polymerization efficiency can be decreased.

Advantages of our process include practical, economic desulfurization of CST and its distillate fractions coincident with restricted tolerable chlorination of organic components (typically we obtain from southeastern United States CST a turpentine product with less than 20 p.p.m. of sulfur and 20 p.p.m. of chlorine), only inconsequential processing losses from, for example, distillation during recovery of distillate components, increased economy over previously proposed sweetening processes for CST and its distillate fractions, and a method for determining practical maximum efficiency of desulfurization with attendant chlorination suppression. Virtually any commercial CST can be employed in this process and such turpentines are well known. Such types include Western, Southeastern, Northeastern, Northwestern, and these terms refer to United States areas where this type of turpentine is generally produced. Also suitable are Canadian, Finnish, and Swedish crude sulfate turpentines.

We remove indigenous sulfur compounds by mixing the feed stock with an aqueous dispersion of hypochlorite oxidant at a temperature between the freezing point of the aqueous phase present and about 70° C., said hypochlorite having not more than 10% available chlorine and having pH of from 10.1–10.6, until substantially maximum desulfurization consistent with the increase therein of organic chlorides to a predetermined limiting value not substantially in excess of 250 p.p.m. thereby forming a spent aqueous phase containing sulfur compounds and a raffinate oil phase, then separating said aqueous phase from said raffinate phase.

Figure 1:
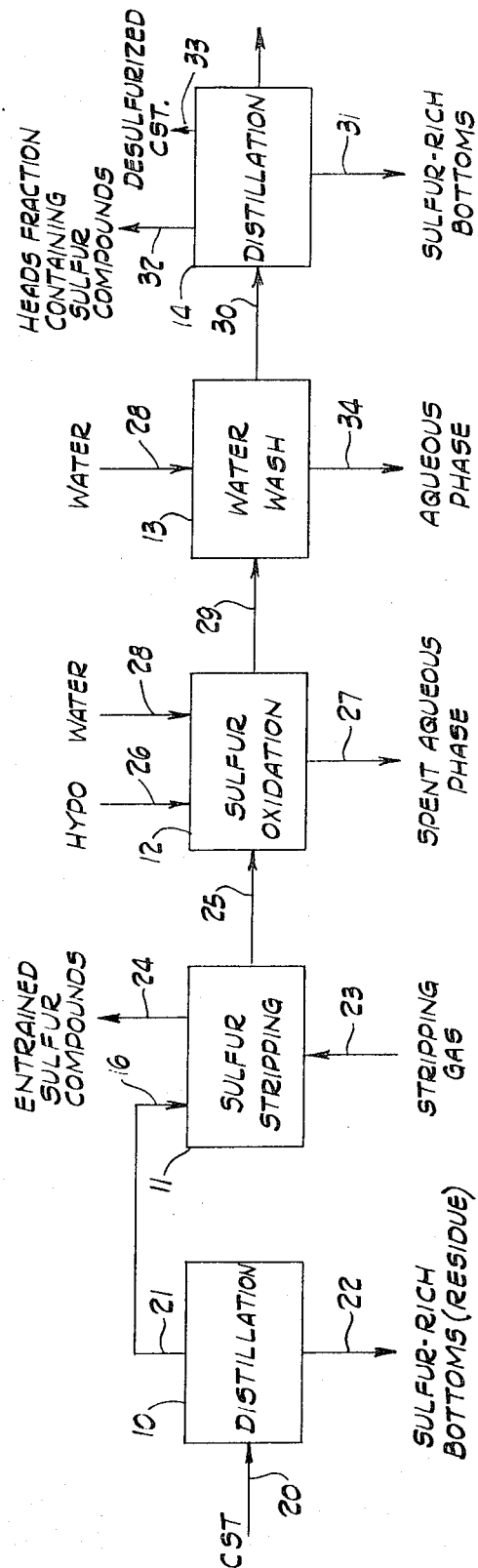
FIG. 1 represents a block flow diagram of our process as applied to the desulfurization of southeastern crude sulfate turpentine, and is more particularly described hereinafter and in Example 2.
Figure 2:
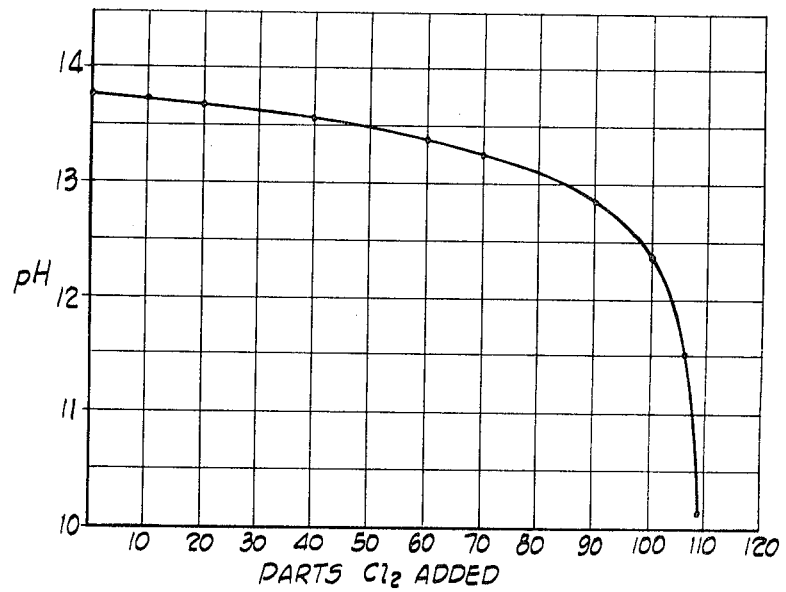
FIG. 2 represents a plot of pH vs. the parts of chlorine added to caustic soda in the formation of a sodium hypochlorite solution useful for our process; this operation is more fully described in Example 1.

Referring to FIG. 1, a batch of feed stock of southeastern CST is charged through line 20 into a distillation kettle 10 for forming a residual product containing sulfur compounds having relatively low volatility (e.g., having boiling point higher than 200–250° C. at 10 mm. Hg absolute). Turpentine distillate and lighter sulfur compounds are removed as overhead through line 21, condensed, and cooled to a temperature of about 25° C., then passed to stripping column 11.

While batch distillation without rectification is preferred, the distillation can, if desired, be done continuously in conventional manner, and trays or packing and reflux can also be used in this operation. Batch distillation is usually conducted at a pressure of about 10 mm. mercury absolute to a final residual distilland temperature of 220–230° C., or until substantially all of the CST is distilled overhead while a small residue of high boiling organics and some heavy sulfur compounds remain as bottoms. The bottoms are discharged through line 22.

Stripping column 11 preferably is operated continuously wherein the cooled distillate flows into the top of column 11 countercurrent to a flow of stripping gas entering the apparatus from line 23. A typical stripping column is packed with conventional packing, e.g., rings, saddles, or the like, or it can have trays or plates. Alternatively, the stripping can be done by sparging the gas into intimate contact with the cooled distillate by any conventional batch or continuous method. In the stripping column some sulfur compounds are volatilized and carried out with the gas through line 24 while the stripped liquid phase feed stock is discharged from column 11 through line 25.

Stripping gases suitable for removal of the volatile sulfur compounds are those which are non-condensable at a temperature of about 250° C. at atmospheric pressure and, preferably, substantially non-reactive with the organic components in the feed stock. Typical useful inert gases include nitrogen, flue gases, argon, helium, carbon dioxide, and steam. Even air can be used where the presence of oxygen can be permitted. Molecular oxygen often reacts with the unsaturated organic components in CST for producing oxides and peroxides therein, which, if not removed, may interfere with polymerization of subsequent distillate components when forming resins therefrom. For this reason, air is not preferred as a stripping gas. Steam also is not preferred because there is usually a high degree of carryover of product.

The stripped stock is then charged to oxidation batch tank 12 from line 25. The oxidation tank is equipped with baffles and agitator for providing intimate mixing of the stripped feed stock and aqueous alkali hypochlorite, which is introduced to the tank through line 26. Water preferably is also charged to the tank through line 28 in a ratio of about 0.05 to 2 weight parts per weight part of stripped feed stock for providing a practical medium for monitoring pH of the aqueous reaction mixture during oxidation.

The alkali hypochlorite solution used has a pH of 10.1 to 10.6 and can have from 1–10% available chlorine. It is introduced suitably in increments of 1–10%, advantageously 1–5%, and preferably 2–4%, by weight of the stripped stock batch, each incremental addition being made at 1–20, and advantageously 2–10, minute intervals. Alternatively, the hypochlorite can be added continuously at a rate approximating the effect of such incremenal addiion. Of course, if mixing equipment is available for affording as much as 6–30 minutes contact time between the aqueous and the turpentine phases each introduced continuously, the operation or a major part of it can be conducted completely continuously as a flow process. Temperatures during oxidation usually are between 0° C. and 70° C. Temperatures below 0° C. are impractical because freezing point suppressants for the aqueous phase, e.g., ethylene glycol, must be used, while temperatures above 70° C. tend to increase the rate of chlorination of the product.

The oxidized stripped feed stock then is allowed to separate by settling in tank 12 into an aqueous layer and a raffinate layer. The water soluble sulfur compounds formed on oxidation with the hypochlorite concentrate in the aqueous phase and leave a raffinate oil phase substantially free thereof. The spent aqueous phase is removed from tank 12 through line 27 and can be discharged to waste. The raffinate phase is separated from the spent aqueous phase by decantation and discharged from tank 12 through line 29 to apparatus 13, suitably a baffled column. Here it is water washed countercurrently for additional purification with wash water entering near the top of the column and raffinate entering near the bottom. Of course, this washing can be done batchwise, if desired using one or more washes, followed by appropriate separations.

The oil phase from the wash column is removed through line 30 to storage not shown and accumulated as feed to fractional distillation apparatus 14, typically and suitably a kettle conventionally equipped with a rectification column, condenser, reflux return, and product drawoff not shown. It is in this apparatus that the feed stock is fractionated conventionally into distillate cuts such as heads, sweetened turpentine or saleable components rich in α-pinene, β-pinene, β-phellandrene, and the like, and bottoms. The sweetened turpentine or saleable components normally have less than 10 p.p.m. sulfur and 10 p.p.m. chlorine. Remaining sulfur compounds in the treated feed stock tend to accumulate in the heads fraction and the bottoms rather than in the sweetened fractions which amount to about 90–98% by weight of the original crude sulfate turpentine. On a weight basis, the unrecovered, dissipated fraction of the original CST feed stock (exclusive of sulfur compounds) amounts to approximately 2–10%. The heads and bottoms can be reserved for reprocessing or use where their impurities are not particularly detrimental.

The above process can be carried out by substituting a sour distillate fraction of sulfate turpentine or mixture thereof such as α-pinene, β-pinene, alpha and beta-phellandrene, dipentene, anethole and delta-3-carene. Sparging and hypochlorite treatment are conducted in the same manner, followed by redistillation recovering a sweetened distillate fraction therefrom.

More refractory turpentines, e.g., those having high percentage of delta-3-carene, such as certain northwestern CST's can be treated in accordance with the above procedure; however on treatment with hypochlorite solution, desulfurization to a level of lower than 100 p.p.m. sulfur is often difficult to obtain before unacceptable chlorine level results. The wood and/or its pulping treatment are believed responsible. Evidently, those more refractory turpentines contain different sulfur compounds unlike those in southeastern CST and do not decompose so completely to form the water soluble sulfur compounds. However on final distillation of the refractory turpentine and western crude, the sulfur compounds often concentrate in the heads and tails fraction, leaving intermediate cuts of alpha and beta-pinene, carene, alpha and beta-phellandrene, and the like having a chlorine and sulfur content which can be even less than 10 p.p.m. each.

Typical hypochlorite oxidants are alkali metal and alkaline earth metal hypochlorites and include sodium hypochlorite, potassium hypochlorite, lithium hypochlorite, and calcium hypochlorite. For efficiency and economy, sodium hypochlorite is preferred for the oxidation of residual sulfur compounds in the stripped feed stock.

Figure 3:
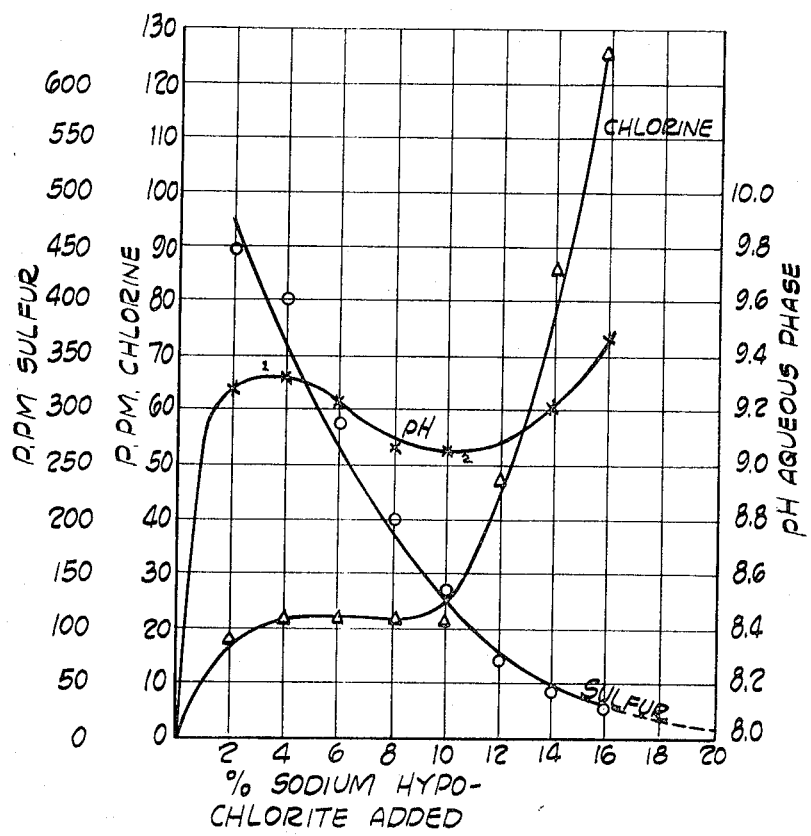
FIG. 3 represents plots of pH, parts per million sulfur in the treated product, and parts per million chlorine in the treated product vs. the parts of 2.5% sodium hypochlorite added to distilled and stripped crude sulfate turpentine measured during the progression of one of our experimental runs; the runs and these plots are more fully described in Example 2.

In accordance with this invention, a means for determining a cut-off point for arresting sweetening has been found. This cut-off point is an indication that the sulfur content and chlorine content of the organic phase are at a relatively low level in the oxidation reaction mixture and at a point where chlorination rate increases substantially without commensurate desulfurization. On oxidation, if addition of hypochlorite is continued beyond this point the rate of chlorination increases substantially while the rate of desulfurization decreases substantially. Accordingly, we prefer not to continue the oxidation treatment before the chlorides reach an intolerable limit in excess of 250 p.p.m. in the organic phase. By plotting the pH of the aqueous phase of the reaction mixture in the oxidation of the stripped stock, it will be noticed that the pH rises to a first maximum point. Desulfurization with additional hypochlorite solution and the pH of the aqueous phase decrease to a first minimum point or inflection point, then on continuing the addition of the hypochlorite solution, the pH begins to increase and rapidly approaches, and even surpasses, the pH of the fresh hypochlorite solution. FIG. 3 is illustrative of this from actual operation. In FIG. 3 the maximum point is designated by symbol 1 and the inflection point is designated by symbol 2 on the pH curve. Hypochlorite addition is arrested at 2 or slightly beyond it where the pH of the aqueous phase is not far from the minimum.

Other controls can be used in place of the foregoing method. These include a number of conventional approaches. For example, aliquots of samples of the organic phase of the reaction mixture can be burned and the combustion products analyzed for chlorine content by coulometry or for both sulfur and chlorine content by mass spectrometry. Such aliquots also can be tested for sulfur content by gas chromatography with adjunct flow ionization or flame photometric detection. Alternatively, chlorine, sulfur or both can be analyzed by X-ray fluorescence, or by neutron activation. The object is to desulfurize the organic phase to a point whereupon a predetermined low chlorine content is reached. For efficiency and economy, the pH method of control is preferred as opposed to those just mentioned.

The following examples are provided to illustrate preferred embodiments of the invention but are not intended to limit the scope thereof. All parts are parts by weight, all weights are weight percentages, and all degrees are degrees centigrade, unless otherwise specified.

EXAMPLE 1

A hypochlorite solution is prepared by charing 129 parts caustic soda, 1889 parts water and 36 parts sodium carbonate to a vessel equipped with an agitator. Chlorine is bubbled into the vessel at a point near the agitator so that intimate contact with the caustic soda is established. The reaction temperature is maintained at 25° and at atmospheric pressure. The addition of chlorine to the vessel is continued until the pH of the solution present is 10.2. A pH of 10.1–10.6 for an aqueous dispersion of hypochlorite solution is representative of a dispersion having virtually no caustic soda present. The resulting hypochlorite solution has an available chlorine content of 5%. It is diluted with water to an available chlorine content of 2.5% prior to use.

EXAMPLE 2

One thousand parts of southeastern CST having a sulfur content of 8304 p.p.m. are charged to a batch distillation pot and distilled at a pressure to 10 mm. mercury until the pot temperature reaches 220° C. The turpentine distills as the overhead and is removed, condensed and cooled to 25° C. Nine hundred eighty parts turpentine distillate having a sulfur content of 1147 are recovered. The bottoms contain non-volatile sulfur compounds and organics. The liquid phase turpentine distillate is pumped to a packed column and there contacted with nitrogen gas at 25° C. at a rate of 2 cc./minute per 1 cc./minute distillate. Nine hundred sixty-five parts of stripped feed stock having a sulfur content of 552 p.p.m. are obtained. The stripped stock and 145 parts water are charged to a vessel equipped with an agitator for oxidation forming a ratio of 100 parts stripped stock to 15 parts water. Agitation is maintained while 20 parts of 2.5% aqueous hypochlorite solution of Example 1 are incrementally added at 5-minute intervals. At the end of each incremental addition the pH of the aqueous phase and the sulfur and chlorine content of the oil phase are measured and plotted, the resulting plots being shown in FIG. 3. Hypochlorite is incrementally added until the first rise in pH from the lowest practical pH is recorded or point of inflection designated by symbol 2 in FIG. 3. At this point hypochlorite addition is arrested. The sulfur content at this point is 72 while the corresponding chlorine content is 49.

To show the effect of additional treatment with sodium hypochlorite solution, more hypochlorite solution is added and the sulfur and chlorine contents are measured at each increment. The addition of hypochlorite solution is stopped when the sulfur content reaches a value of 26 p.p.m. and the chlorine content reaches a content of 125 p.p.m., which is at the upper preferred chlorine limit. At this time, agitation is stopped and the raffinate oil phase and water phase containing the soluble sulfur compounds are allowed to separate. The raffinate oil phase is decanted and passed to a vessel for subsequent washing with water and separated. Nine hundred fifty-five parts raffinate phase are recovered. The final separated raffinate oil phase is substantially devoid of water soluble sulfur compounds. Then the raffinate oil phase is fractionally distilled, producing components of alpha and beta-pinene having less than 10 p.p.m. sulfur and chlorine, the chlorine and sulfur compounds concentrating in the heads and tails fraction.

EXAMPLE 3

To show the effect of using a diluted hypochlorite solution, the following experiment is conducted. One thousand parts of a southeastern CST having a sulfur content of 2184 parts sulfur is treated with a calcium hypochlorite solution having a pH of 10.2 and available chlorine concentration of 4.2. The table below represents the parts of 2.5% hyprochlorite solution and parts water mixed with the 1000 parts of CST. The sulfur and chlorine are indicated.

| Hypochlorite added, parts | Water | Sulfur | Chlorine |
| --- | --- | --- | --- |
| 700 | 0 | 144 | 2,400 |
| 700 | 700 | 147 | 1,625 |
| 700 | 1,400 | 126 | 1,279 |
| 500 | 1,000 | 140 | 676 |

The above table shows that the degree of chlorination of organics in the CST is a function of the concentration of the hyprochlorite solution in contact therewith and that lower chlorine values with corresponding decreased sulfur content is achieved where the chlorine concentration is dilute.

EXAMPLE 4

A feed stock of southeastern crude sulfate turpentine having 3800 p.p.m. sulfur content is distilled and stripped by sparging nitrogen gas therethrough, the distillation and stripping being conducted in accordance with the procedure set forth in Example 2. The stripped stock has a sulfur content of 1193 p.p.m.

The stripped feed stock is divided into 4 equal portions. The first portion is treated with the same sodium hypochlorite solution produced in Example 1 and incrementally added at 5-minute intervals in a proportion of 2% by weight of the feed stock at 25° C. The sulfur and chlorine content at the inflection point on the pH curve are 340 p.p.m. and 76 p.p.m., respectively. The pH is 10.1.

The second portion of stripped feed stock is treated with another sodium hypochlorite solution, sold commercially, having approximately 16% available chlorine and a pH of >12, and is incrementally added at 2% by weight of the feed stock at 5-minute intervals. The sulfur and chlorine content after ten increments have been added are 431 p.p.m. and 606 p.p.m., respectively. The pH of the aqueous phase is greater than 12. No inflection point results when plotting pH of the aqueous phase.

The third portion of stripped feed stock is treated with a sodium hypochlorite solution having approximately 2½% available chlorine but is stabilized with sodium hydroxide producing a sodium hypochlorite solution having a pH of 11.5. The hypochlorite solution is incrementally added to the feed stock in 2% by weight amounts every 5 minutes, as was done with the first and second portion. The sulfur and chlorine content after ten increments have been added are 540 p.p.m. and 251 p.p.m., respectively. The pH is 11.5. No inflection point results when plotting pH of the aqueous phase.

The fourth portion is treated with the hypochlorite solution of Example 1, that is, hypochlorite solution having 2.5% available chlorine and a pH of 10.4. The only difference in this procedure and that used in the first portion is that the hypochlorite is added in an amount of 20% by weight of the stripped feed stock every 5 minutes. The sulfur and chlorine content after ten increments have been added are 446 p.p.m. and 173 p.p.m. respectively. No inflection point results when plotting pH of the aqueous phase.

What is claimed is:

1. A process for desulfurizing a feed stock of crude sulfate turpentine or distillate fraction thereof containing indigenous sulfur compounds which comprises: oxidizing said sulfur compounds while simultaneously retarding the chlorination of organic materials present in said feed stock by mixing it with an aqueous dispersion of hypochlorite oxidant at a temperature between the freezing point of the aqueous phase present and 70° C., said hypochlorite having not more than 10% avaliable chlorine and having a pH of from 10.1 to 10.6, until substantially maximum desulfurization occurs consistent with the increase therein of organic chlorides to a predetermined limiting value not substantially in excess of 250 p.p.m., thereby forming a spent aqueous phase containing sulfur compounds and a raffinate oil phase; and separating said aqueous phase from said raffinate phase.

2. The process of claim 1, wherein, prior to oxidizing, said feed stock is stripped of readily volatile sulfur compounds to generate a stripped stock containing residual sulfur compounds.

3. The process of claim 2 wherein said stripping is accomplished by sparging with inert gas at a temperature of from 10° C. to 50° C.

4. The process of claim 3 wherein 1–20 parts of stripped stock is mixed into an aqueous suspension with 1–2 parts water, and an aqueous alkaline hypochlorite dispersion having 1–10% available chlorine is added to said suspension with agitation in increments of 1–5 weight percent of said stripped stock at about 2–25 minute intervals to effect the oxidation of sulfur compounds present.

5. The process of claim 4 wherein said raffinate oil phase is washed with water.

6. The process of claim 4 wherein said hyprochlorite is a sodium or calcium hypochlorite, and said oxidation is conducted at a temperature of from about 15–35° C.

7. The process of claim 4 which includes the step of fractionally distilling said raffinate oil phase for recovery of at least one turpentine component in said raffinate phase having substantially reduced sulfur content.

8. The process of claim 4 wherein said feed stock contains at least about 5000 p.p.m. sulfur.

9. The process of claim 1 wherein oxidation of sulfur compounds is correlated when pH of the spent aqueous phase is approximately at its low inflection point.

References Cited

UNITED STATES PATENTS

| 1,493,454 | 5/1924 | Jobson | 260—675.5 |
| 1,938,693 | 12/1933 | Gillespie et al. | 260—675.5 |
| 2,459,570 | 1/1949 | McGregor | 260—675.5 |

OTHER REFERENCES

| 194,286 | 3/1922 | Great Britian | 260—675.5 |

DELBERT E. GANTZ, Primary Examiner

J. M. NELSON, Assistant Examiner

U.S. Cl. X.R.

208—230, 241